(12) United States Patent
Parduhn et al.

(10) Patent No.: US 9,322,536 B1
(45) Date of Patent: Apr. 26, 2016

(54) LARGE CAPACITY GUSSETED TUBE AND TRAFFIC CONTROL ASSEMBLY COMPRISING SAME

(71) Applicant: Pelco Products, Inc., Edmond, OK (US)

(72) Inventors: Stephen P. Parduhn, Edmond, OK (US); Kenneth E. George, Edmond, OK (US); Derric K. Drake, Stillwater, OK (US)

(73) Assignee: PELCO PRODUCTS, INC., Edmond, OK (US)

( * ) Notice: Subject to any disclaimer, the term of this patent is extended or adjusted under 35 U.S.C. 154(b) by 55 days.

(21) Appl. No.: 14/214,999

(22) Filed: Mar. 16, 2014

Related U.S. Application Data (60) Provisional application No. 61/800,269, filed on Mar. 15, 2013.

(51) Int. Cl.
*F21V 21/116* (2006.01)
*G08G 1/095* (2006.01)
*F16M 13/02* (2006.01)
*F21V 21/34* (2006.01)
*F16M 11/04* (2006.01)
*G09F 7/18* (2006.01)

(52) U.S. Cl.
CPC ............ *F21V 21/116* (2013.01); *F16M 11/046* (2013.01); *F16M 13/02* (2013.01); *F21V 21/34* (2013.01); *G08G 1/095* (2013.01); *G09F 2007/1821* (2013.01)

(58) Field of Classification Search
CPC ....... F21V 21/116; F21V 21/34; G08G 1/095; F16M 11/046; G09F 2007/1821

USPC .......... 248/161, 423, 223.41, 224.51, 224.61, 248/225.11, 219.4, 218.4, 245, 221.11, 248/220.21, 407

See application file for complete search history.

(56) References Cited

U.S. PATENT DOCUMENTS 3,071,350 A * 1/1963 Opie ........................ 256/65.08
3,179,257 A * 4/1965 Tassell ........................ 211/193

(Continued)

FOREIGN PATENT DOCUMENTS

WO    WO 2011091914 A1 *  8/2011

OTHER PUBLICATIONS

Transportation Research Board of the National Academies, "Not So Good Vibrations," Ignition, Fall/Winter 2011, p. 6, Fall/Winter 2011, Transportation Research Board of the National Academies, Washington, DC, USA.

*Primary Examiner* — Terrell McKinnon
*Assistant Examiner* — Eret McNichols
(74) *Attorney, Agent, or Firm* — Mary M. Lee (57) ABSTRACT

A support tube assembly for use in mounting traffic signals and other traffic control devices. The tube has a standard 1.9 inch outer diameter with a wider three-quarter inch access slot and a larger internal volume to accommodate five-eighth inch conductors. The support tube assembly may include a secondary mounting assembly for attaching a second traffic control device. The secondary mounting assembly includes a mounting strip that fits inside the access slot and a mounting plate that attaches to the strip. Each edge of the access slot has a contoured profile that mates with the corresponding side on the mounting strip so, when the secondary mounting assembly is attached to the tube, the edges of the access slot are gripped between the back of the mounting plate and the inner mounting strip. A cut-to-fit vinyl closure strip is included to enclose the exposed sections of the access slot.

10 Claims, 8 Drawing Sheets

(56) References Cited

U.S. PATENT DOCUMENTS

| | | | |
|---|---|---|---|
| 3,239,070 A * | 3/1966 | Clauson | 211/105.1 |
| 3,250,584 A * | 5/1966 | Tassell | 312/247 |
| 3,258,250 A * | 6/1966 | McMullin | 256/13.1 |
| 3,586,280 A | 6/1971 | Parduhn | |
| 3,652,048 A * | 3/1972 | Hartman | 248/243 |
| 3,764,099 A | 10/1973 | Parduhn | |
| 3,854,685 A | 12/1974 | Parduhn | |
| 3,896,743 A * | 7/1975 | Pariente | 108/190 |
| 4,032,248 A | 6/1977 | Parduhn et al. | |
| D246,585 S | 12/1977 | Parduhn | |
| D249,517 S | 9/1978 | Parduhn | |
| 4,135,192 A | 1/1979 | Parduhn | |
| 4,163,537 A * | 8/1979 | Mourgue | 248/188.1 |
| 4,212,445 A * | 7/1980 | Hagen | 248/245 |
| 4,220,316 A * | 9/1980 | Naka et al. | 256/59 |
| 4,410,157 A * | 10/1983 | Monti et al. | 248/125.8 |
| D276,213 S | 11/1984 | Parduhn | |
| 4,533,104 A * | 8/1985 | Bell | 248/245 |
| 4,585,131 A * | 4/1986 | Crossman et al. | 211/206 |
| D286,667 S | 11/1986 | Parduhn | |
| 4,641,448 A * | 2/1987 | Cobb et al. | 40/607.02 |
| 4,659,046 A | 4/1987 | Parduhn | |
| 4,691,884 A | 9/1987 | Parduhn | |
| 4,860,985 A * | 8/1989 | Olson et al. | 248/229.17 |
| 4,917,338 A * | 4/1990 | Olson et al. | 248/229.17 |
| D328,243 S | 7/1992 | Parduhn | |
| D329,589 S | 9/1992 | Parduhn | |
| D335,279 S | 5/1993 | Parduhn | |
| 5,299,111 A | 3/1994 | Parduhn et al. | |
| D373,947 S | 9/1996 | Parduhn | |
| D379,756 S | 6/1997 | Parduhn | |
| 5,645,255 A | 7/1997 | Parduhn | |
| 5,845,037 A * | 12/1998 | Miekis | 385/136 |
| 5,901,523 A * | 5/1999 | Tasi | 52/653.2 |
| 5,935,478 A | 8/1999 | Parduhn | |
| 6,119,317 A * | 9/2000 | Pfister | 24/514 |
| 6,190,085 B1 * | 2/2001 | Johansson | 404/6 |
| 6,204,446 B1 | 3/2001 | Parduhn | |
| 6,357,709 B1 | 3/2002 | Parduhn | |
| 7,165,690 B2 * | 1/2007 | Wu | 211/192 |
| 7,195,213 B2 * | 3/2007 | Weatherly | 248/125.1 |
| 7,258,314 B1 | 8/2007 | Parduhn et al. | |
| 7,523,912 B1 | 4/2009 | Woods | |
| 7,575,212 B1 * | 8/2009 | Langelius | 248/243 |
| 7,578,245 B2 * | 8/2009 | Loines | 108/110 |
| 7,601,928 B1 | 10/2009 | Magness et al. | |
| 7,699,278 B2 * | 4/2010 | Goldstein | 248/220.21 |
| 7,703,737 B2 * | 4/2010 | Petrick et al. | 248/407 |
| 7,832,570 B1 * | 11/2010 | Reynolds | 211/103 |
| 7,876,236 B2 | 1/2011 | Townsend, Jr. | |
| 7,878,476 B2 * | 2/2011 | Carson et al. | 248/429 |
| 7,997,546 B1 | 8/2011 | Andersen et al. | |
| 8,018,350 B2 | 9/2011 | Townsend, Jr. | |
| 8,154,425 B2 | 4/2012 | Townsend, Jr. | |
| 8,173,904 B1 | 5/2012 | Parduhn et al. | |
| 8,395,531 B2 | 3/2013 | Townsend, Jr. | |
| 8,474,780 B2 | 7/2013 | Parduhn et al. | |
| 8,540,392 B2 | 9/2013 | Townsend, Jr. | |
| 8,561,820 B2 * | 10/2013 | Kitt et al. | 211/187 |
| 8,659,445 B2 | 2/2014 | Townsend, Jr. | |
| 8,714,372 B2 * | 5/2014 | Yogev | 211/71.01 |
| 8,749,402 B2 | 6/2014 | Townsend, Jr. | |
| 9,016,023 B2 * | 4/2015 | Timko et al. | 52/651.07 |
| 2003/0168951 A1 * | 9/2003 | Holbrook et al. | 312/245 |
| 2004/0061032 A1 * | 4/2004 | Bradford et al. | 248/218.4 |
| 2005/0286256 A1 * | 12/2005 | Tran et al. | 362/404 |
| 2007/0278376 A1 | 12/2007 | Townsend, Jr. | |
| 2008/0210651 A1 * | 9/2008 | Chen | 211/207 |
| 2011/0089298 A1 | 4/2011 | Townsend, Jr. | |
| 2011/0089301 A1 | 4/2011 | Townsend, Jr. | |
| 2011/0155872 A1 | 6/2011 | Townsend, Jr. | |
| 2011/0233346 A1 * | 9/2011 | Schluter | 248/65 |
| 2011/0253859 A1 * | 10/2011 | Ostermeier et al. | 248/223.41 |
| 2012/0286107 A1 * | 11/2012 | Neuhof et al. | 248/68.1 |
| 2013/0087672 A1 | 4/2013 | Townsend, Jr. | |
| 2013/0095710 A1 | 4/2013 | Townsend, Jr. | |
| 2013/0146733 A1 | 6/2013 | Townsend, Jr. | |
| 2013/0241380 A1 | 9/2013 | Townsend, Jr. | |
| 2013/0248673 A1 | 9/2013 | Townsend, Jr. | |
| 2014/0042288 A1 | 2/2014 | Townsend, Jr. | |
| 2014/0048669 A1 | 2/2014 | Townsend, Jr. | |

* cited by examiner

LARGE CAPACITY GUSSETED TUBE AND TRAFFIC CONTROL ASSEMBLY COMPRISING SAME

CROSS-REFERENCE TO RELATED APPLICATIONS

This application claims the benefit of U.S. provisional application No. 61/800,269 entitled "Large Capacity Gusseted Tube and Traffic Control Assembly Comprising Same," filed Mar. 15, 2013, the contents of which are incorporated herein by reference.

FIELD OF THE INVENTION

The present invention relates generally to traffic control devices and more particularly to tubular members for use with such devices.

BRIEF DESCRIPTION OF THE DRAWINGS

The accompanying drawings, which are incorporated into and form a part of the specification, illustrate one or more embodiments of the present invention and, together with this description, serve to explain the principles of the invention. The drawings merely illustrate one or more preferred embodiments of the invention and are not to be construed as limiting the scope of the invention.

DETAILED DESCRIPTION OF THE PREFERRED EMBODIMENT(S)

Traffic control devices, such as traffic signals, commonly are mounted using an elongate support tube. This type of mounting is shown and described in U.S. Pat. No. 4,659,046, entitled Traffic Control device Mast Arm Bracket, issued Apr. 21, 1987, and the contents of this patent are incorporated herein by reference. These tubular members are made with internal gussets for increased strength. These conventional tubes have a standardized outer diameter of 1.9 inches and a longitudinal access slot of one-half (0.5) inch.

As the number and complexity of traffic control devices has increased, the number and size of the electrical conduits required by these devices has also increased. While the internal gussets provided added strength, they also reduced the internal space in the tube available for conduits. Larger five-eighth inch conduits will not fit inside the standard tubes. This led many users to remove the rubber sheath from the larger cables so that the individual wires could be fitted inside the tube. This increased the time required to install the equipment and exposed the unsheathed individual wires to damage.

In accordance with the present invention, an improved gusseted tube is provided. The inventive tube has maintained the standard outer diameter of 1.9 inches and also has retained the internal gussets for strength. However, reconfiguration of the gussets has increased the internal space for the conduits and allowed a wider access slot. The larger five-eighth inch conduits fit into the larger internal space without removing the protective sheath. These and other advantages of the improved traffic control device support tube will become apparent from the following description.

Figure 1:
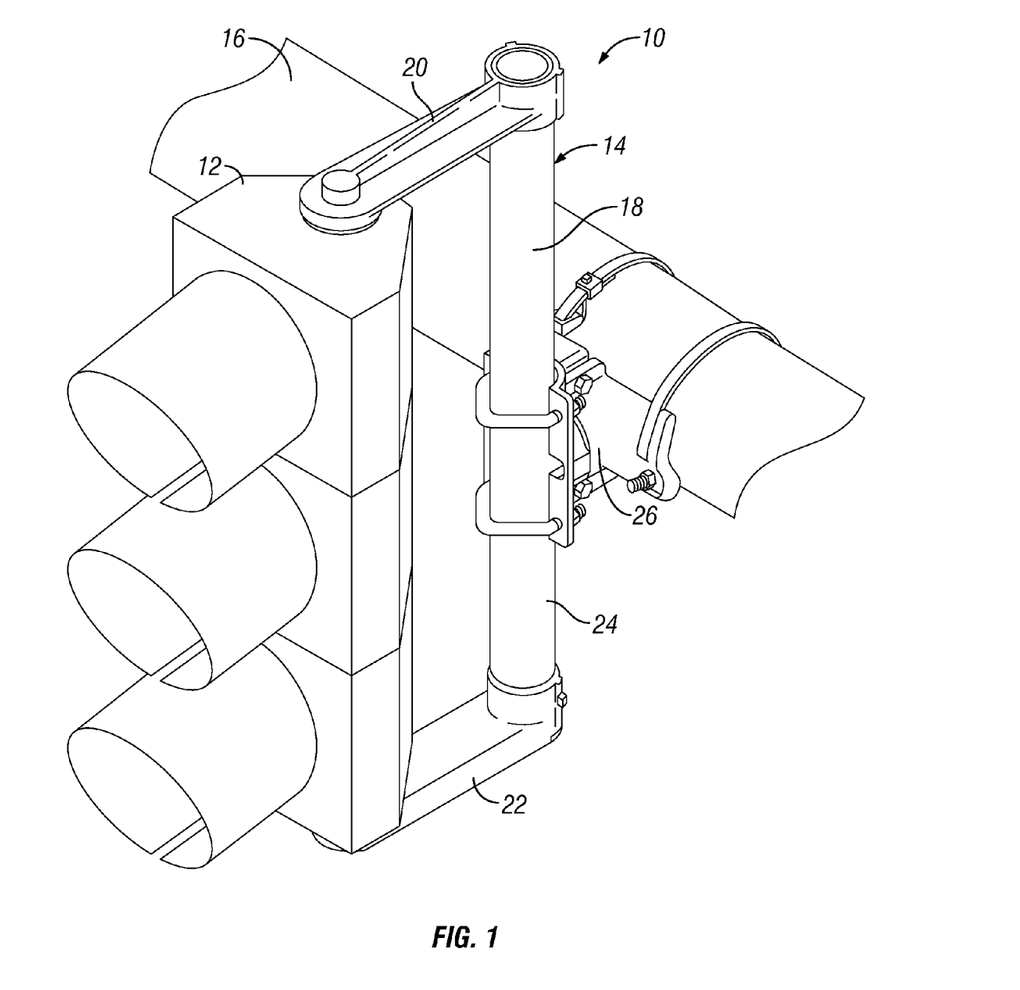
FIG. 1 is a perspective view of a traffic signal mounted on a mast arm. The signal's mounting structure comprises an elongate tube constructed in accordance with the present invention.
Figure 2:
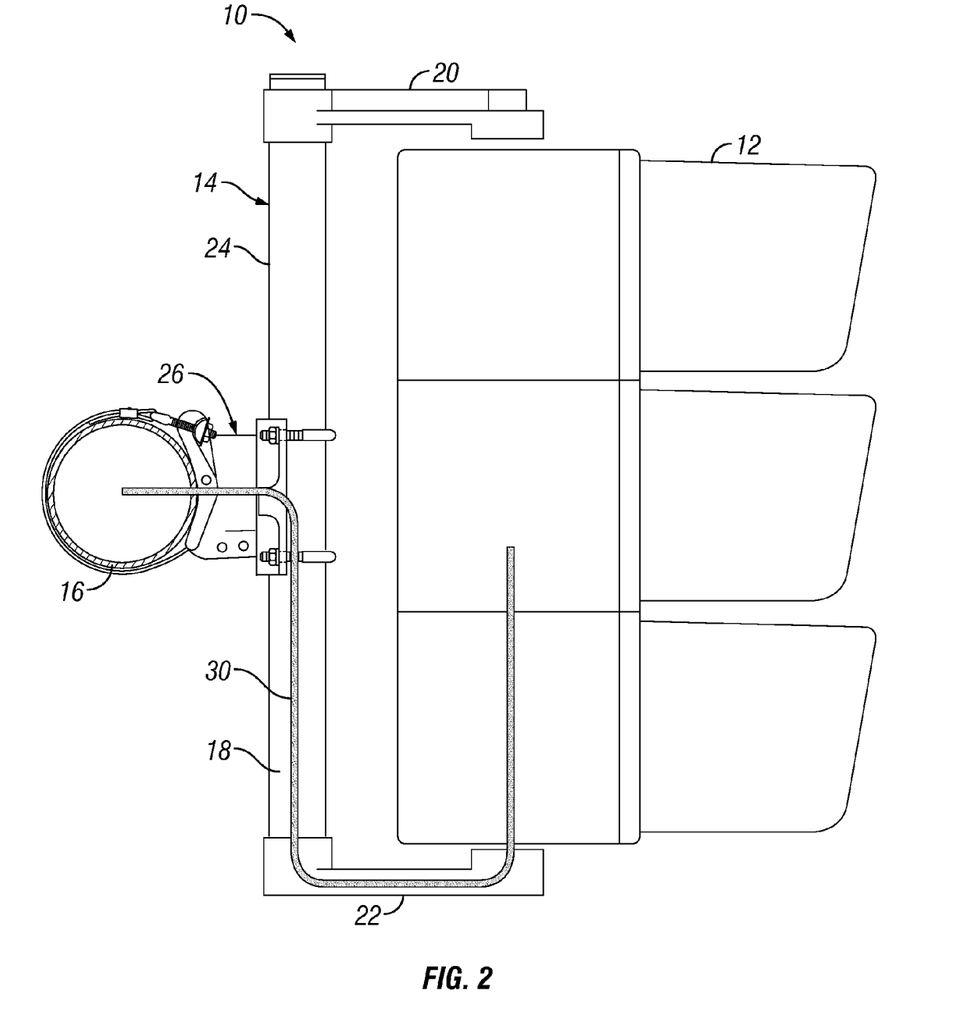
FIG. 2 is a side view illustrating the wiring path in the signal shown in FIG. 1.

Turning now to the drawings in general and to FIGS. 1 and 2 in particular, there is shown therein a traffic control assembly made in accordance with a preferred embodiment of the present invention and designated generally by the reference number 10. The traffic control assembly 10 comprises at least a first or primary traffic control device, such as the traffic signal light 12. The traffic light 12 is a typical vertical three-light signal. However, as used herein, "traffic control device" refers to any signal, sign, monitor, camera, or other device supported by or over or near a roadway for controlling or monitoring vehicular or pedestrian traffic.

The traffic control assembly 10 further comprises a primary mounting assembly 14 for supporting the traffic light 12 or other traffic control device on a structure such as the mast arm 16 shown in FIGS. 1 and 2. The primary mounting assembly 14 comprises a support tube assembly 18 that supports the traffic light 12. The support tube assembly 18 may comprise upper and lower horizontal arms 20 and 22 extending from the top and bottom of an elongate support tube 24. Also included in the primary mounting assembly 14 is a clamp assembly 26 that attaches the support tube assembly 18 to the mast arm 16. As illustrated in the partly schematic view of FIG. 2, the electrical conduit 30 supplying the light 12 enters from the mast arm 16, passes through the clamp 26 down through the tube 24 and lower arm 22 and into the light 12.

Figure 3:
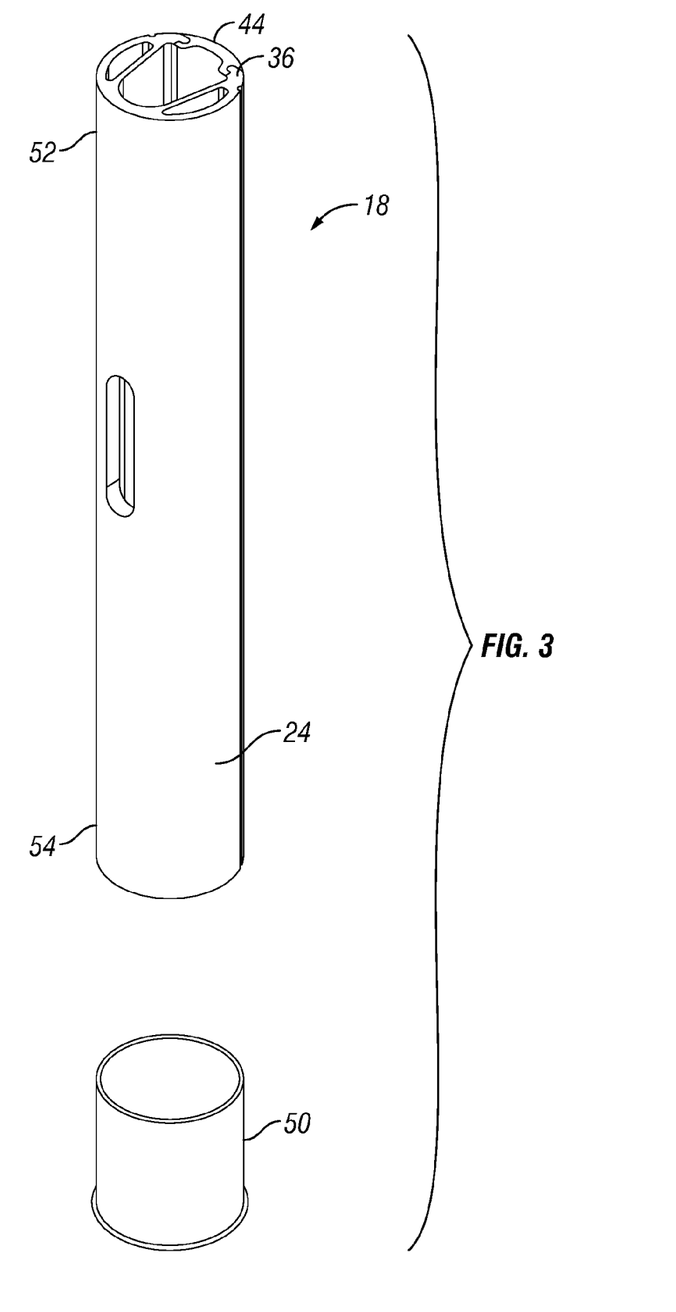
FIG. 3 is an exploded, perspective view of the tube assembly of the present invention.
Figure 4:
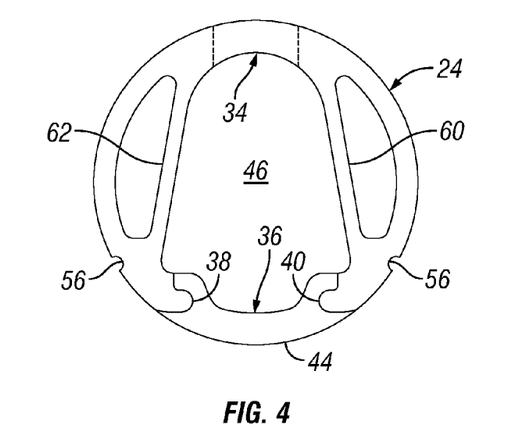
FIG. 4 is an end elevational view of the tube and insert.
Figure 5:
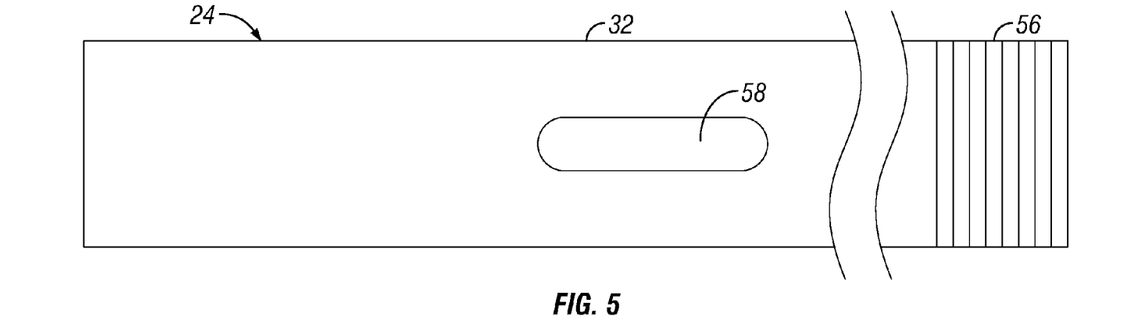
FIG. 5 is a fragmented, side elevational view of the tube.

FIGS. 3-5 show a preferred configuration for the inventive support tube 24. Preferably, the outer diameter of the tube 32 is 1.9 inches, as this a standardized dimension. As best seen in FIG. 4, the tube 24 defines an inner perimeter designated generally at 34. The tube 24 also includes an access slot 36 running longitudinally the length of the tube. The slot 36 is formed by opposing edges designated generally at 38 and 40 in FIG. 4. The preferably is at least about 0.75 inch in width.

A flexible closure strip 44 is included to enclose the internal space 46 of the tube 24. The strip 44 is sized to be received in the slot 36, as best seen in FIG. 4. The strip 44 may be vinyl or plastic so that it can be cut easily to fit around the space where the conduit 30 passes from the clamp 26 into the tube 24, as shown in FIG. 2.

The tube 24 may include one or more end caps, such as the cap 50 shown in FIG. 3. The length of the tube 24 may vary. One or more set screw grooves 56 are provided in the tube 24 and may be spaced along the length of the tube. The tube 24 may include an opening 58 for use with a "dog house" signal housing.

Figure 6:
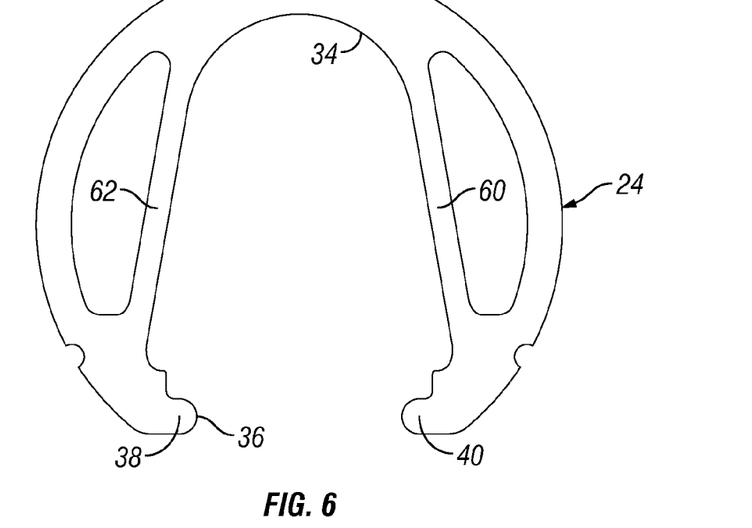
FIG. 6 is an enlarged end view of the tube showing dimensions in detail.

Referring still to FIG. 4 and now also to FIG. 6, the tube 24 comprises in cross-sectional profile a pair of lateral reinforcing gussets 60 and 62. The reinforcing gussets 60 and 62 diverge from the inner perimeter 34 of the side of the tube 24 opposite the access slot 36 and extend toward the inner perimeter adjacent each side of the access slot 36. Thus, each of the gussets 60 and 62 has an inner perimeter continuous with the inner perimeter 34 of the tube 24. The gussets 60 and 62 are configured so that the inner perimeters of the gussets 60 and 62 with the inner perimeter 34 of the tube 24 between the gussets together define a central conductor receiving space 46 have a cross-sectional area of at least 1.325 square inches. In accordance with a particularly preferred embodiment, the various dimensions of the tube are those shown in FIG. 6.

Figure 7:
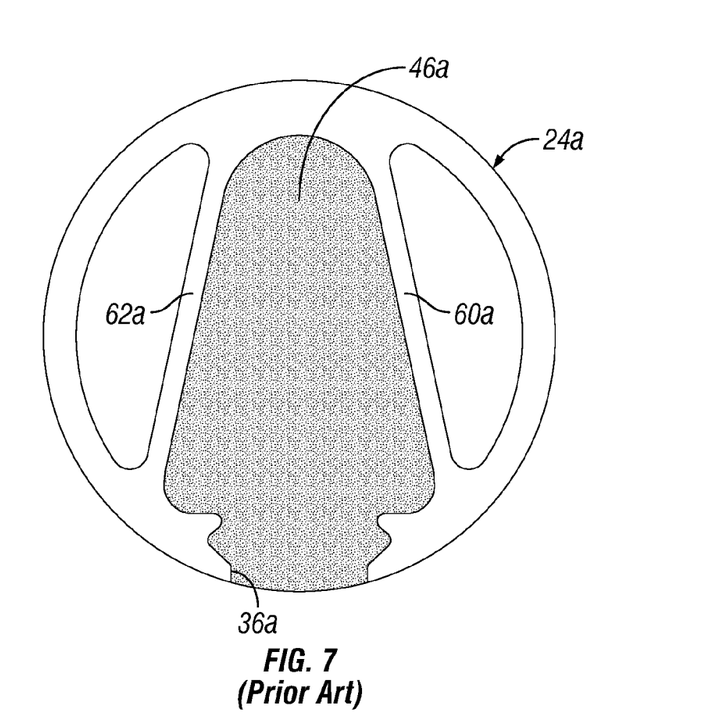
FIG. 7 is an enlarged end view of a prior art gusseted tube showing the cross-sectional area for receiving the conduits.
Figure 8:
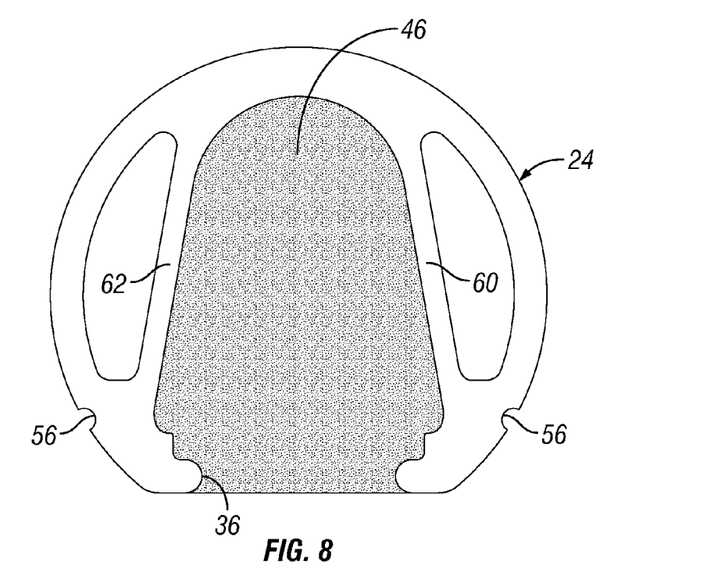
FIG. 8 is an enlarged end view of the inventive gusseted tube showing the cross-sectional area for receiving the conduits.

The particular relative dimensions, as shown in FIG. 6, provide a wider access slot 36 of about 0.75 while the outer diameter of the tube 24 (1.9 inch), the cross-sectional material area of the inventive tube, and the section modulus are all similar to the conventional tube. FIGS. 7 and 8 show side-by-side illustrations of the cross-sectional profiles of a prior art tube 24a (FIG. 7) and the inventive tube 24 (FIG. 8). The central conduit receiving space 46 in each tube is lined to highlight the different internal configurations.

Figure 9:
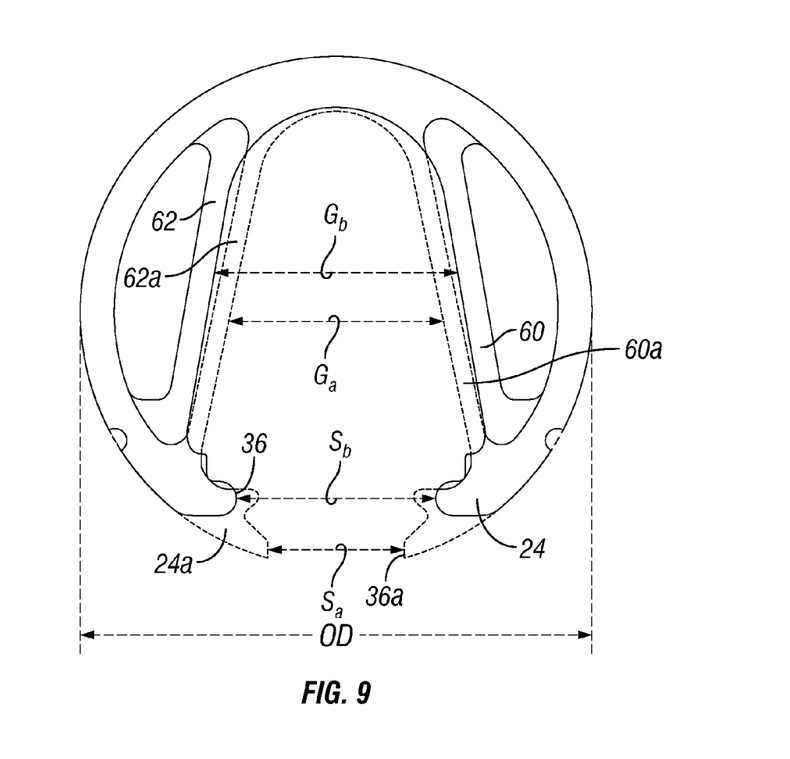
FIG. 9 is an overlay diagram illustrating the different profiles of the inventive tube compared to the prior art tube. The profile of the prior art tube is shown in phantom.

FIG. 9 is a schematic illustration showing the profile of the inventive tube 24 overlying the profile of the prior art tube 24a. As shown, the dimension OD is the outer diameter, which is the same for both tubes, namely, 1.9 inches. The dimension $S_a$ is the width of the access slot 36a of the prior art tube, namely 0.5 inch. Dimension $S_b$ is the width of the access slot of the inventive tube, namely, 0.75 inch. The dimension $G_a$ designates the distance between the gussets 60a and 62a in the prior art tube, while the dimension $G_b$ is the distance between the gussets 60 and 62 in the inventive tube. The large interior space and wider slot accommodates more and larger cables and other conduits. More specifically, it easily accommodates larger, sheathed five-eighths inch conduits.

In some instances, it may be desirable to attach a second traffic control device (not shown) on the same support tube 24 as first or primary device 12. For example, it may be advantageous to mount a camera as a secondary traffic control device on the same support tube 24 with the three-light signal 12, which is referred to herein as the primary traffic control device. To that end, the traffic control assembly 10 may include a secondary mounting assembly 70.

Figure 10:
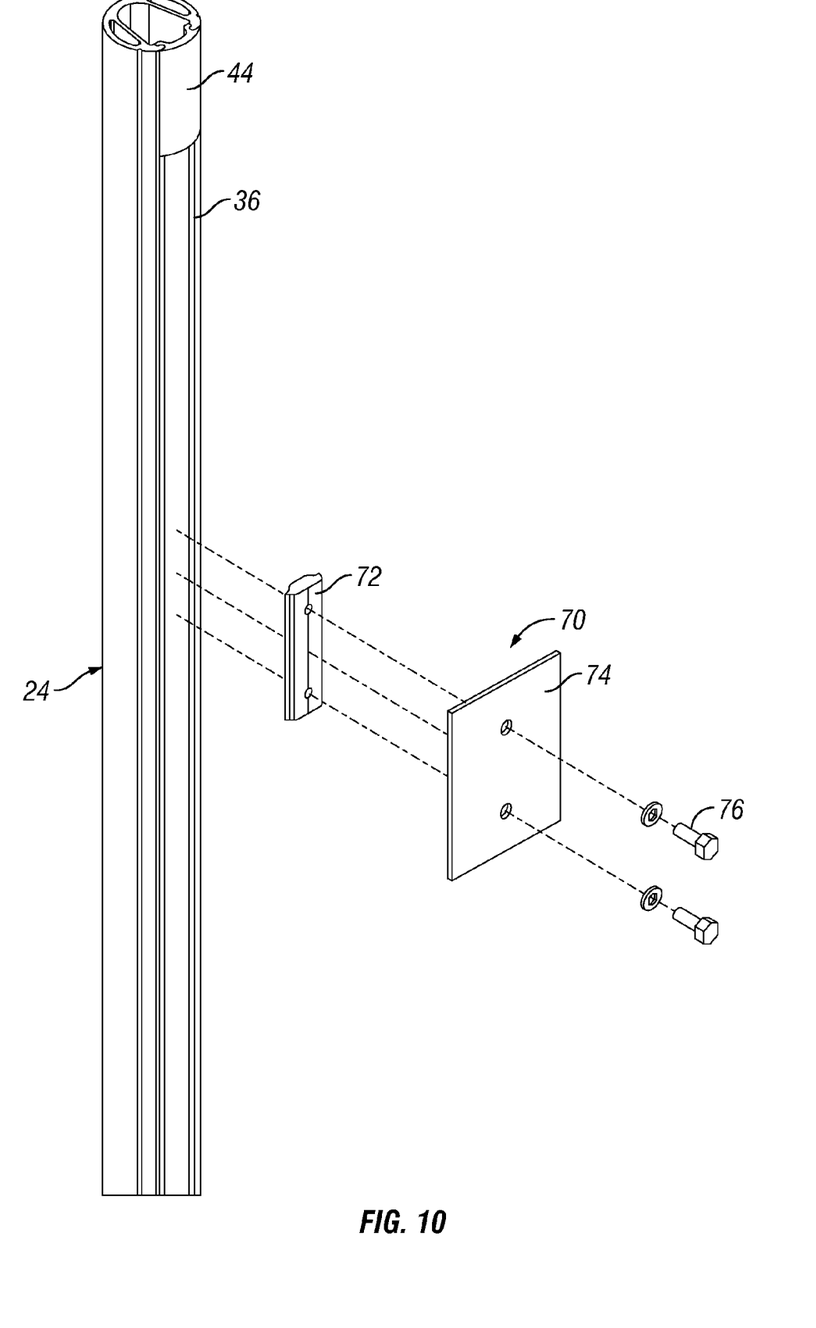
FIG. 10 is a partially exploded view of the gusseted tube assembly with a signal mounting strip and plate installed in the conduit opening.

A preferred secondary mounting assembly 70 is shown in FIG. 10-12A to which attention now is directed. As seen in FIG. 10, the secondary mounting assembly 70 comprises a rigid signal mounting strip 72 and a mounting plate 74 attachable to the mounting strip. The mounting plate 74 is shown as a simple rectangular plate. One or more bolts 76 may be used to attach the plate 74 to the strip 72. The dimension of this plate may vary depending on the nature of the secondary traffic control device.

Figure 11:
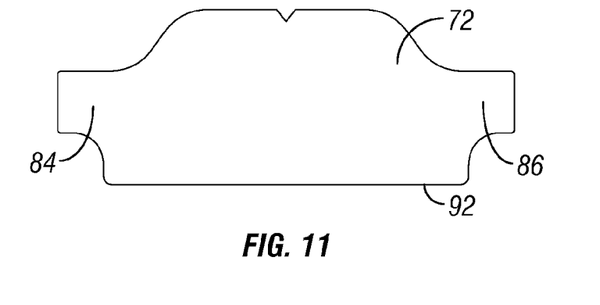
FIG. 11 is an enlarged end elevational view of the mounting strip extrusion.
Figure 12:
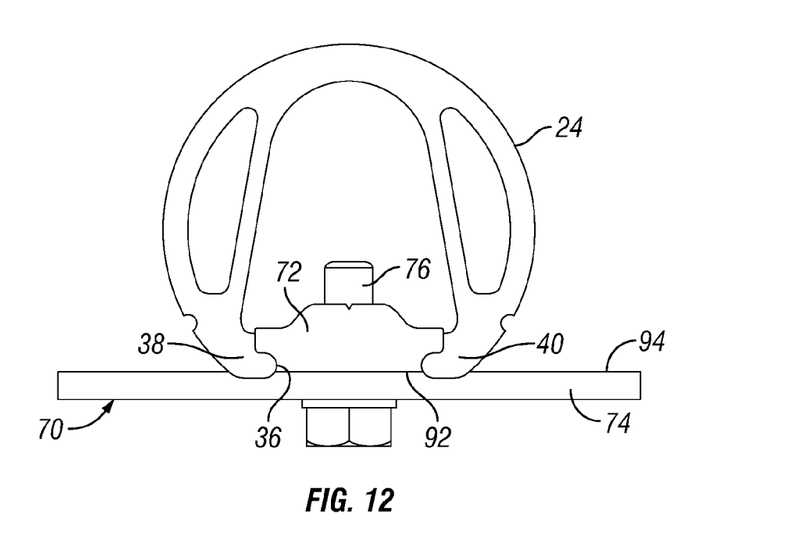
FIG. 12 is a cross-sectional view of the gusseted tube assembly taken through the signal mounting strip and plate.
Figure 12A:
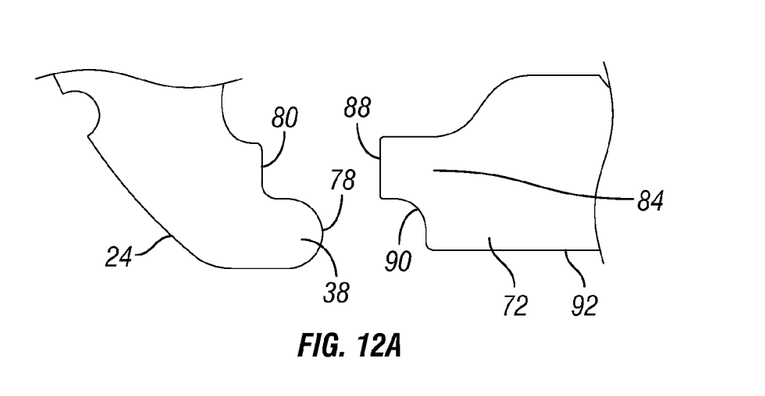
FIG. 12A is an enlarged exploded fragmented view of the mating profiles of the mounting strip and the access slot.

As best shown in FIGS. 11-12A, the mounting strip 72 is strip of metal that is configured to be received in the access slot 36 of the tube 24. The cross-sectional profile of the strip 72 is shaped to mate with the shape of the edges 38 and 40 of the access slot 36. The edges 38 and 40 are mirror images of each other and thus only the edge 38 will be described in detail with reference to FIG. 12A.

The edge 38 includes a protruding lip or rib 78 that defines the minimum dimensions of the slot 36. Preferably, the rib 78 is rounded, but other shapes may be employed. Stepped back from or behind the rib 78 is a shoulder 80, which may be a right angle profile. The shoulder 80 preferably is continuous with the rib 78, which is exterior to the shoulder. The strip 72 has a cross-sectional profile that includes opposite sides 84 and 86, each such side comprising a corner 88 sized to be received in the shoulder 80 of the edge 38. Continuous with and exterior to the corner 88 is a concavity 90 shaped to receive the rib 78 of the edge 38. Thus, the concavity 90 extends between the corner 88 and the front or outer surface 92 of the strip 72.

Referring now to FIG. 12, it will be seen that when the strip 72 is inserted in the slot 36, the front surface 92 is exposed. In this way, when the plate 74 is bolted to the strip, each of the ribs 38 is gripped in the concavity 90 and between back surface 94 of the mounting plate 74 and the corners 88 on the sides 84 of the mounting strip 72. This provides a sturdy but adjustable way to mount a secondary traffic control device to the tube 24.

Yet another advantage of the secondary mounting assembly 70 and the cooperating profiles of the sides of the strip 72 and the edges 38 and 40 of the slot 36 is that the mounting strip can be inserted into the tube 24 through the access slot and positioned between the shoulders of the access slot from the side of the tube and without entering either end of the tube. More specifically, because of the relative dimensions and profiles of the strip 72 and tube 24, the strip can be turned sidewise and moved into the tube and then backed into position in the slot 36 at any point along the length of the tube; there is no need to slide the strip into position from either end of the tube.

The embodiments shown and described above are exemplary. Many details are often found in the art and, therefore, many such details are neither shown nor described herein. It is not claimed that all of the details, parts, elements, or steps described and shown were invented herein. Even though numerous characteristics and advantages of the present inventions have been described in the drawings and accompanying text, the description is illustrative only. Changes may be made in the details, especially in matters of shape, size, and arrangement of the parts within the principles of the inventions to the full extent indicated by the broad meaning of the terms of the attached claims. The description and drawings of the specific embodiments herein do not point out what an infringement of this patent would be, but rather provide an example of how to use and make the invention. Likewise, the abstract is neither intended to define the invention, which is measured by the claims, nor is it intended to be limiting as to the scope of the invention in any way. Rather, the limits of the invention and the bounds of the patent protection are measured by and defined in the following claims.

What is claimed is:

1. A gusseted support tube assembly for use in a primary mounting assembly for a primary traffic control device, the tube assembly comprising:

an elongate cylindrical support tube having a 1.9 inch outer diameter and defining an inner perimeter;

wherein the support tube comprises a 0.75 inch wide access slot running longitudinally the length of the tube, the access slot formed by opposing edges;

wherein the support tube further comprises in cross-sectional profile a pair of lateral reinforcing gussets diverging from the inner perimeter of the side of the tube opposite the access slot toward the inner perimeter adjacent each side of the access slot, each gusset having an inner perimeter continuous with the inner perimeter of the tube;

wherein the inner perimeters of the gussets with the inner perimeter of the tube between the gussets together define a central conductor receiving space have a cross-sectional area of at least 1.325 square inches; and a flexible closure strip sized to be received in the access slot of the support tube.

2. The gusseted support tube assembly of claim 1 further comprising secondary mounting assembly including a rigid mounting strip for mounting a secondary traffic control device to the support tube, the rigid mounting strip configured to be received in the access slot of the tube.

3. The gusseted support tube assembly of claim 2 wherein each of the opposing edges of the access slot is defined in cross section at least partly by a shoulder, and wherein the cross-sectional profile of the mounting strip includes opposite sides, each such side comprising a corner sized to be received in the shoulder of one of the edges of the access slot.

4. The gusseted support tube assembly of claim 3 wherein the support tube has opposing open ends and wherein the access slot and the mounting strip are cooperatively formed so that the mounting strip can be inserted into the support tube through the access slot and positioned between the shoulders of the access slot edges from the side of the support tube and without entering either end of the tube.

5. The gusseted support tube assembly of claim 4 wherein the secondary mounting assembly further comprises a mounting plate removably attachable to the rigid mounting strip so that the mounting plate is supported on the outer side of the support tube.

6. The gusseted support tube assembly of claim 5 wherein each of the opposing edges of the access slot is further defined by a protruding rib that is continuous with and exterior to shoulder of the edge, wherein the mounting strip has an front surface that is exposed when the strip is installed in the access slot of the support tube, wherein each side of the mounting strip defines in cross section a concavity between the corner and the front surface of the strip and continuous with the corner, wherein the mounting plate has a back surface, and wherein the corner and concavity of each side of the mounting strip are sized to conform to the shoulder and protruding rib of one of the opposing edges of the access slot, so that when the mounting plate is attached to the mounting strip each of the ribs is gripped in the concavity on one of the sides of the mounting strip and between the back surface of the mounting plate and the corner on the side of the mounting strip.

7. A primary mounting assembly for a primary traffic control device comprising the gusseted support tube assembly of claim 6.

8. A traffic control assembly comprising the primary mounting assembly of claim 7.

9. A primary mounting assembly for a primary traffic control device comprising the gusseted support tube assembly of claim 1.

10. A traffic control assembly comprising the primary mounting assembly of claim 9.

* * * * *

UNITED STATES PATENT AND TRADEMARK OFFICE
CERTIFICATE OF CORRECTION

PATENT NO. : 9,322,536 B1
APPLICATION NO. : 14/214999
DATED : April 26, 2016
INVENTOR(S) : Stephen P. Parduhn et al.

Page 1 of 1

It is certified that error appears in the above-identified patent and that said Letters Patent is hereby corrected as shown below:

In the Specification:

Column 2, line 53: replace "this a" with --this is a--.
Column 2, line 58: replace "The preferably" with --The slot 36 preferably--.
Column 3, line 42: replace "as first" with --as the first--.
Column 3, line 49: replace "FIG. 10-12A" with --FIGS. 10-12A--.
Column 3, line 57: replace "72 is" with --72 is a--.
Column 4, line 36: replace "inventions" with --invention--.
Column 4, line 39-40: replace "inventions" with --invention--.

In the Claims:

Column 6, line 3: replace "exterior to" with --exterior to the--.

Signed and Sealed this
Twenty-eighth Day of June, 2016

Michelle K. Lee
*Director of the United States Patent and Trademark Office*